April 3, 1928.
H. M. DENYES
1,664,669
ANTIRATTLE BRACELET
Filed March 4, 1927
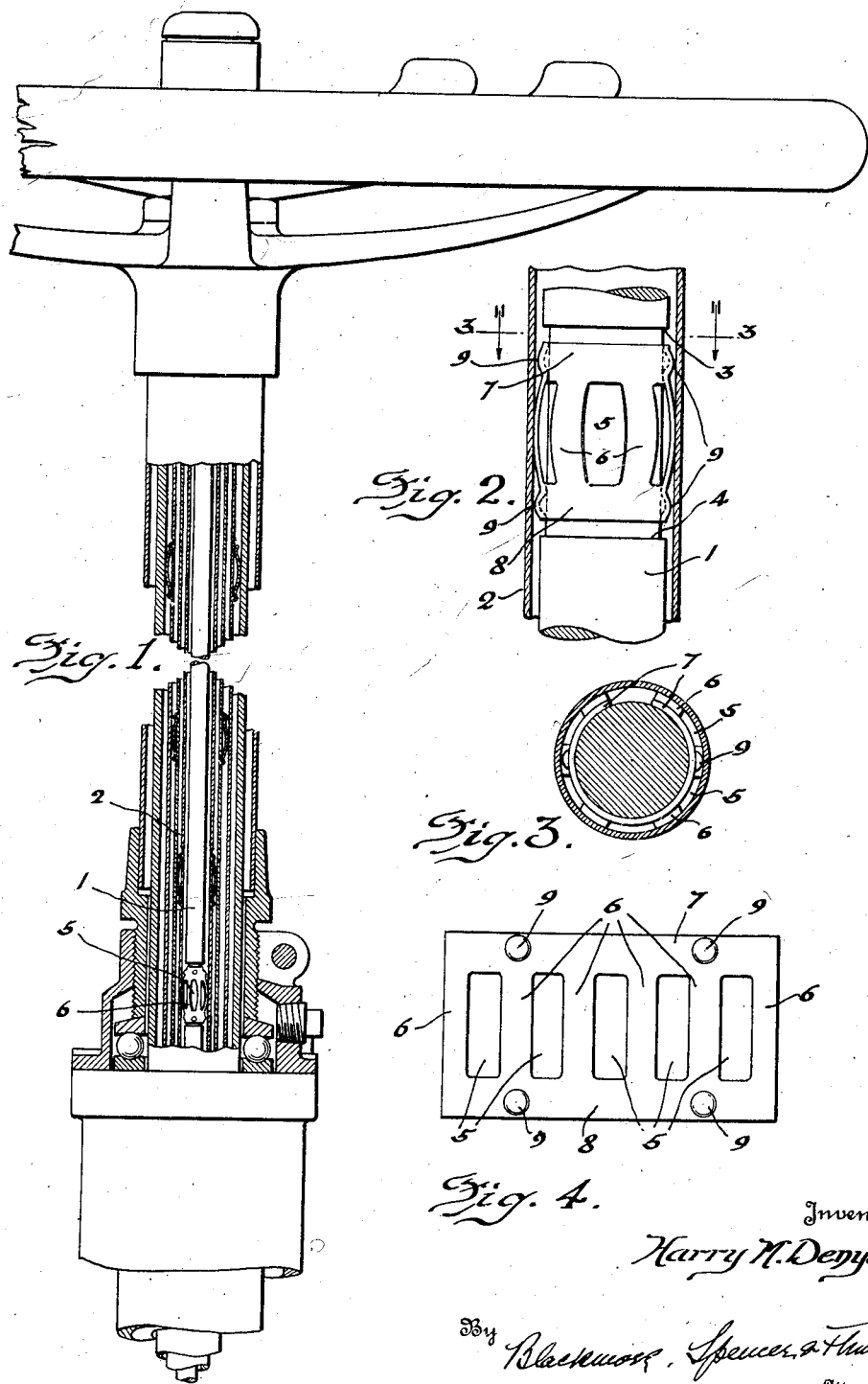

Patented Apr. 3, 1928.

1,664,669

UNITED STATES PATENT OFFICE.

HARRY M. DENYES, OF SAGINAW, MICHIGAN, ASSIGNOR TO GENERAL MOTORS CORPORATION, OF DETROIT, MICHIGAN, A CORPORATION OF DELAWARE.

ANTIRATTLE BRACELET.

Application filed March 4, 1927. Serial No. 172,782.

My invention relates to steering column assemblies for motor vehicles, wherein two or more tubular control shafts are nested one within another, and particularly to a resilient buffer or spacer element for interposition between the shafts for the purpose of cushioning vibration and preventing noise and rattle. To this end, there is contemplated the provision of a split annular collar located within a peripheral groove on the inner shaft, and having spring fingers for engagement with the adjacent surface of the surrounding tube.

The primary object of the present invention is to provide the collar with peripheral projecting bosses, which when added to the thickness of the collar, will be greater than the space between the tubes except at the groove itself, whereby the collar is prevented from slipping longitudinally and working out of the groove, either during assembly or in use.

Other objects and advantages will be apparent from the following specification relating to a preferred embodiment of the invention, when taken in connection with the accompanying drawing, wherein:

Figure 1 is an elevation of a steering column assembly, partly in section, illustrating the application of the present subject matter.

Figure 2 is an enlarged detail view of a pair of tubular shafts with a collar therebetween.

Figure 3 is a transverse sectional view on line 3—3 of Figure 2.

Figure 4 is a plan view of the flat sheet metal stamping from which the annular collar is formed.

Referring more specifically to the drawing, in Figure 2 an inner shaft 1 is shown nested within an outer tubular shaft 2, the two shafts being rotatably movable relative to each other, with a comparatively small clearance space between adjacent surfaces thereof. The surface of the inner tube 1 is cut away to provide an annular groove or depression, affording spaced shoulders 3 and 4, between which is located the annular split collar or band. This annular collar is preferably formed by stamping a blank sheet of metal to substantially the outline shown in Figure 4, wherein a series of openings 5 are cut out, leaving the ribs or fingers 6 connecting the opposite end portions 7 and 8. At the same time, teats or projections 9 are pressed in the material of the end portions 7 and 8. The stamping is then rolled into circular form and the ribs 6 are bowed outwardly, the end portions 7 and 8 being made slightly smaller in diameter than the grooved portion of the tube they are to surround, so that when placed in position they have a tendency to contract about and tightly grip the inner tube, while the fingers or ribs 6 contact with and exert outward spring pressure against the adjacent surface of the outer tube, whereby the two shafts are maintained in proper spaced relation and held against rattle. Deflection or distortion of the spring fingers will cause the collar to expand longitudinally, there being ample clearance provided for such expansion between the shoulders 3 and 4. In some instances, the end portions 7 and 8 would have a slight tendency to expand radially and if the teats or projections 9 were not provided, the collar would pass over one of the shoulders 3—4 and work out of the groove. These projections, however, serve to increase the thickness of the collar beyond the size of the clearance space between the shafts, and therefore, the collar is not free to move beyond either shoulder 3 or 4.

Figure 1 illustrates a steering column assembly wherein each of the several internested control tubes, is provided with the spacer or buffer before described. In this case, the several collars are shown in relative positions as have been found quite satisfactory and convenient, but their location may obviously be varied to meet conditions of use, and it is also to be understood that more than one collar may be employed on each shaft, if so desired. It is further to be understood, that while the invention has been described more or less specifically in its most simple form, it is capable of such modifications as come within the scope of the appended claims.

Having described the invention I claim:

1. In combination, two relatively movable members located one within another in spaced relation, a portion of adjacent surfaces of said members having a relatively greater clearance space therebetween than the remaining portions thereof, and a resilient spacer element interposed between said members in the relatively large space and provided with enlargements to increase the width of the spacer beyond the relatively small intermediate space whereby the spacer element is held within the larger space.

2. In combination, a pair of spaced members located one within another for relative rotation, the adjacent surface of one of the members having a depression therein, and a spacer element located within said depression, having spring fingers yieldingly engaging the other of said members, and being provided with projections which prevent the spacer element from being dislodged from said depression.

3. In combination, a pair of nested tubular shafts, the adjacent surfaces of the shafts being spaced from each other, the surface of the inner shaft having an annular groove therein to afford a relatively large space, a resilient spacer element interposed between the shafts in said relatively large space, including a split annular collar surrounding the inner shaft and provided with spring fingers for engagement with the outer shaft, and having bosses formed thereon which are of such extent that the thickness of the collar together with the bosses, exceeds the clearance between the tubular shafts except at said groove, whereby the collar is maintained within the relatively large space.

4. In combination, a pair of nested tubular shafts, the inner shaft having a peripheral groove therein, and a resilient spacer element for the shafts located within said groove, said spacer comprising a split annular collar surrounding the inner shaft and having spring fingers engaging the outer shaft, and being provided with enlargements to limit radial expansion of the collar for maintaining the spacer within said groove.

5. A spacer element for a pair of relatively movable nested tubular shafts, adapted for location within an annular groove in one of the shafts, consisting of a split annular collar provided with spring fingers and having an enlarged portion formed thereon to increase the width of the collar beyond that of the space between the shafts for the purpose of maintaining the collar within the groove.

In testimony whereof I affix my signature.

HARRY M. DENYES.